(12) United States Patent
Gommans et al.

(10) Patent No.: US 9,217,671 B2
(45) Date of Patent: Dec. 22, 2015

(54) HIGH SPECTRAL RESOLUTION COLOR SENSOR USING NON-DISPERSIVE ELEMENTS

(75) Inventors: Hendrikus Hubertus Petrus Gommans, Eindhoven (NL); Marcellinus Petrus Carolus Michael Krijn, Eindhoven (NL); Hugo Johan Cornelissen, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 942 days.

(21) Appl. No.: 13/391,412

(22) PCT Filed: Aug. 25, 2010

(86) PCT No.: PCT/IB2010/053809
§ 371 (c)(1),
(2), (4) Date: Feb. 21, 2012

(87) PCT Pub. No.: WO2011/027260
PCT Pub. Date: Mar. 10, 2011

(65) Prior Publication Data
US 2012/0146517 A1 Jun. 14, 2012

(30) Foreign Application Priority Data
Sep. 1, 2009 (EP) .................................... 09169140

(51) Int. Cl.
| | |
|---|---|
| H05B 37/02 | (2006.01) |
| G01J 3/36 | (2006.01) |
| G01J 1/04 | (2006.01) |
| G01J 1/32 | (2006.01) |
| G01J 1/42 | (2006.01) |
| G01S 3/784 | (2006.01) |
| G01J 3/12 | (2006.01) |

(52) U.S. Cl.
CPC .... *G01J 3/36* (2013.01); *G01J 1/04* (2013.01); *G01J 1/0411* (2013.01); *G01J 1/0437* (2013.01);
(Continued)

(58) Field of Classification Search
None
See application file for complete search history.

(56) References Cited

U.S. PATENT DOCUMENTS

| | | | |
|---|---|---|---|
| 6,384,458 B1 | 5/2002 | Bode et al. | |
| 7,400,404 B2 | 7/2008 | Jung et al. | |

(Continued)

FOREIGN PATENT DOCUMENTS

| | | |
|---|---|---|
| WO | 2007015236 A1 | 2/2007 |
| WO | 2008047033 A1 | 4/2008 |

(Continued)

*Primary Examiner* — Cassandra Cox
(74) *Attorney, Agent, or Firm* — Meenakshy Chakravorty

(57) ABSTRACT

The invention describes a light sensor (1) comprising a filter arrangement (11), which filter arrangement (11) comprises a number of spectral filters ($F_1, F_2, \ldots, F_n$) for filtering incident light (L), wherein a spectral filter ($F_1, F_2, \ldots, F_n$) is realized to pass a distinct component of the incident light (L), an aperture arrangement (12) for admitting a fraction of the incident light (L), and a sensor arrangement (13) realized to collect the admitted filtered light (L'), which sensor arrangement (13) comprises an array of sensor elements (130) for generating image-related signals ($S, S_1, S_2, \ldots, S_n$) and which sensor array is sub-divided into a number of regions ($R_1, R_2, \ldots, R_n$), wherein a region ($R_1, R_2, \ldots, R_n$) of the sensor array is allocated to a corresponding spectral filter (Fi, F2, ..., Fn) such that an image-related signal (S) generated by a sensor element (130) of a particular region ($R_1, R_2, \ldots, R_n$) comprises information pertaining to the direction of origin and/or the spectral composition of the light passed by the corresponding spectral filter ($F_1, F_2, \ldots, F_n$). The invention further describes a light sensor device (10) for determining the direction of origin and/or the spectral composition of light (L) incident at the light sensor device (10), a method of collecting incident light (L), and a method of determining the direction of origin and/or the spectral composition of incident light (L).

15 Claims, 6 Drawing Sheets

(52) U.S. Cl.
CPC ................ *G01J 1/32* (2013.01); *G01J 1/4228* (2013.01); *G01S 3/784* (2013.01); *G01J 1/0488* (2013.01); *G01J 2003/1213* (2013.01)

(56) References Cited

U.S. PATENT DOCUMENTS

| | | |
|---|---|---|
| 2003/0128355 A1 | 7/2003 | Perkins et al. |
| 2004/0082092 A1 | 4/2004 | Yamamoto |
| 2005/0018332 A1 | 1/2005 | Vizard et al. |
| 2006/0146330 A1* | 7/2006 | Maniam ........................ 356/405 |
| 2007/0206242 A1 | 9/2007 | Smith |
| 2008/0278724 A1 | 11/2008 | Wu et al. |
| 2009/0073451 A1 | 3/2009 | Tekolste et al. |
| 2010/0282953 A1* | 11/2010 | Tam .............................. 250/226 |
| 2011/0156596 A1* | 6/2011 | Salsbury ....................... 315/152 |

FOREIGN PATENT DOCUMENTS

| | | |
|---|---|---|
| WO | 2009022282 A2 | 2/2009 |
| WO | 2009093191 A2 | 7/2009 |

* cited by examiner

HIGH SPECTRAL RESOLUTION COLOR SENSOR USING NON-DISPERSIVE ELEMENTS

FIELD OF THE INVENTION

The invention describes a light sensor and a light sensor device for determining the direction of origin and/or the spectral composition of incident light. The invention further describes a method of collecting incident light and a method of determining the direction of origin and/or the spectral composition of incident light.

BACKGROUND OF THE INVENTION

In many lighting systems, an accurate control of the light intensity and light colour would be desirable, for example in office environments or any lighted indoor space in which a uniform lighting effect should be attained, regardless of whether some regions have additional natural light (e.g. window areas) while other regions are only illuminated by artificial light. With prior art lighting systems using white light sources such as incandescent, halogen or fluorescent lamps that generate essentially white light, control is limited to detecting too-bright or too-dark regions in the environment and regulating the corresponding light sources. The distribution of the light in a room or environment is referred to as the 'angular distribution' of the light.

For more advanced lighting systems using luminaries that comprise different coloured light sources combined to produce, for example, white light, the control is more complicated since each of the red, blue and green components influence the overall colour-point or colour temperature of the light. Light in a room can therefore have a 'spectral distribution' that is not uniform, with different parts of the room being illuminated with light of different colour temperatures.

Some attempts at analysing such spectral and angular light distributions with a view to controlling lighting arrangements have been based on the use of dispersive elements such as prisms or gratings to act as band-pass filters. Here, the spectral distribution is obtained by measuring the light transmission over its angular span. This is generally done by continuously adjusting the geometrical configuration of sensor comprising such a dispersive element, and subsequently projecting the light transmission onto a photodiode or photomultiplier. In order to spectrally characterize a light source using prior art techniques, it is necessary to mount the dispersive sensor in a fixed known position with respect to the light source, and the acceptance angle must be restricted to a narrow cone in order to obtain a well-defined transmission spectrum for the individual filters. However, to obtain an accurate impression of the angular distribution of the light in the room or environment, the light must be collected over a wide angle. Using current methods, a large number of sensors would have to be distributed about a room in order to obtain an accurate determination of the spectral composition and spatial distribution of the light in that room. Evidently, such a solution would be prohibitively expensive as well as complicated, since the outputs of all sensors would have to be compared and analyzed in order to generate appropriate control signals for the light source(s) in the room.

Therefore, it is an object of the invention to provide a straightforward and economical way of accurately determining the spectral composition and spatial distribution of light.

SUMMARY OF THE INVENTION

The object of the invention is achieved by a light sensor according to claim 1, a light sensor device according to claim 8, a method of collecting incident light according to claim 11, and a method according to claim 12 of determining the direction of origin and/or the spectral composition of incident light.

A light sensor according to the invention comprises a filter arrangement comprising a number of spectral filters for filtering incident light, wherein each spectral filter is realized to pass a distinct component of the incident light. The light sensor further comprises an aperture arrangement for admitting a fraction of the incident light and a sensor arrangement realized to collect the admitted filtered light, which sensor arrangement comprises an array of sensor elements (or "sensor array") for generating image-related signals and which sensor array is sub-divided into a number of regions, wherein a region of the sensor array is allocated to a corresponding spectral filter such that an image-related signal generated by a sensor element of a particular region comprises information pertaining to the direction of origin and/or the spectral composition of the light passed by the corresponding spectral filter.

In the following, the terms "distinct component of light" or "specific light wavelength" are to be interpreted as a specific light wavelength range which may be relatively narrow or relatively wide depending on the filter characteristics. The spectral filters of the filter arrangement are preferably chosen to pass light of wavelength bands. For example, one filter can pass light with wavelengths from 400 nm to 440 nm; another can pass light with wavelengths from 440 nm to 480 nm, etc. If cut-off filters are used, i.e. short-pass or long-pass filters, the wavelength range extends from zero to the cut-off wavelength of the filter, or from the cut-off wavelength of the filter to infinity, respectively. In the following, for the sake of simplicity, any reference to the 'wavelength' of light passed by a filter of the filter arrangement is to be understood to mean the relevant wavelength band. Also, a spectral filter is to be understood to be any angular-dependent or angular-independent filter, e.g. a colour filter such as coloured glass, a light filter, a dichroic filter, etc., realized to pass a certain wavelength or range of wavelengths, as will be described in greater detail below.

Advantageously, the light sensor according to the invention allows for both spectral analysis and angular analysis with a single filter/sensor arrangement. The sensor arrangement in the light sensor according to the invention can be a single sensor chip, as will be explained in further detail below. This simplicity is in contrast to prior art sensors which require several sensors and therefore several sensor chips arranged strategically with respect to the light source(s). In the light sensor according to the invention, different spectral filters are used to selectively pass the incident light, according to its wavelength, onto different regions of the single sensor array. Since the incident light coming from any or all directions is therefore separately imaged by the spectral filters at different positions of the sensor according to wavelength, the spectral resolution of the single light sensor according to the invention compares very favourable to that of a prior art light sensor. Since the light sensor according to the invention can deliver information regarding both light colour and direction of origin of the incoming light, an accurate 'picture' can be obtained of the light distribution in a room or other environment.

Because of its simple construction, since there is no need for mechanical or electronic rotating or translating mechanisms to obtain measurements at different angles of incidence to 'tune' the light sensor during operation, as is the case for prior art sensors, and the manufacturing costs of the light sensor according to the invention are favourably low compared to prior art sensors.

Correspondingly, the method according to the invention of collecting incident light comprises the steps of filtering the incident light through a filter arrangement, which filter arrangement comprises a number of spectral filters for filtering incident light, wherein a spectral filter is realized to pass a distinct component of the incident light, and admitting the light incident at the filter arrangement by means of an aperture arrangement. The method further comprises the step of collecting the admitted filtered light at a sensor arrangement comprising an array of sensor elements for generating image-related signals, which sensor array is sub-divided into a number of regions and wherein a region of the sensor array is allocated to a corresponding spectral filter such that an image-related signal generated by a sensor element of a particular region comprises information pertaining to the direction of origin and/or the spectral composition of the light passed by the corresponding spectral filter.

A light sensor device according to the invention for determining the direction of origin and/or the spectral composition of light incident at the light sensor device comprises such a light sensor for generating image-related signals in response to admitted filtered light collected by the light sensor, and an analysis unit for analysing the image-related signals to determine the direction of origin and/or the spectral composition of light incident at the light sensor device.

The corresponding method according to the invention of determining the direction of origin and/or the spectral composition of incident light comprises the steps of collecting the light in a light sensor to generate image-related signals in response to admitted filtered light collected by the light sensor using the above method, and analysing the image-related signals to determine the direction of origin and/or the spectral composition of light incident at the light sensor device.

The dependent claims and the subsequent description disclose particularly advantageous embodiments and features of the invention.

The incoming light measured by the light sensor can originate from any number of light sources and/or from natural light, for example light entering through a window. The light sensor may be located in a room or corridor or any part of a building, but may also be positioned in an outdoor location. For the sake of simplicity, the position of the light sensor in the following may be taken to be 'in a room', without however restricting the invention in any way.

To obtain a favourable image of the incoming light, the light sensor in a particularly preferred embodiment of the invention is realized such that an aperture of the aperture arrangement is located between a spectral filter of the filter arrangement and a corresponding region of the sensor arrangement. The term 'aperture' is to be interpreted in its broadest sense, i.e. to comprise an opening that admits part of the light arriving at a filter. The opening can be, but is not necessarily, a 'hole' in an otherwise opaque layer. For example, an aperture may be given by opaque regions in an otherwise transparent layer placed such that the incoming light through a filter casts a 'shadow' on the corresponding region of the sensor array. If the aperture is a simple hole in an opaque layer, it then acts as a sort of pin-hole camera to obtain an image (in reverse) of the angular distribution of the light. The aperture also serves to improve the quality of the image obtained at the sensor array by reducing any coma or blur to give a sharper image. Since the filter arrangement preferably comprises a plurality of spectral filters arranged above a sensor array, the aperture arrangement also preferably comprises a corresponding plurality of apertures to admit a fraction of the light passing through each spectral filter. In one possible realization of the light sensor according to the invention, then, an array of spectral filters is positioned over a corresponding array of apertures, so that a resulting array of images of the incoming light is collected in the corresponding regions of the sensor array. Each 'image' on the sensor array is created by one distinct spectral filter, therefore, and is associated with specific angular and spectral information. The order in which filter, aperture, lens and sensor array are 'assembled' can depend on the application for which the light sensor is to be used. For instance, it may be desirable in a particular situation to have a light sensor device in which the apertures are 'above' the filter array.

The light sensor according to the invention, in which the filter arrangement is situated at a distance from the sensor array and in which each filter of the filter arrangement is accorded a region of the sensor array, each region comprising a plurality of sensor elements, is not to be confused with a "colour filter array", such as a Bayer filter, which features a different construction—i.e. a single miniature filter placed on top of each pixel of the sensor array—and which serves an entirely different purpose.

The aperture arrangement described above, while admitting the incoming light quite favourably, may be associated with a 'spread' of the admitted filtered light on the sensor array. Therefore, in a further preferred embodiment of the invention, to improve the light collection performance of the light sensor, the light sensor preferably comprises a lens arrangement for focussing the admitted filtered light onto a region of the sensor arrangement. One example of such a lens arrangement might be an array of microlenses, and may be positioned above or below the aperture arrangement, depending on its realization. There are several different types of microlenses available, for example a microlens may have one plane surface and one spherical convex surface. Another type of microlens could have an aspherical surface. Yet another type may comprise flat layers of optical materials with different refractive indices for refracting incoming light in the desired manner. A microlens can have a size anywhere from a few micrometers up to about one millimeter. Preferably, a microlens array simply comprises a repeating arrangement of microlenses manufactured as a single structure.

One example of a spectral filter is a 'light filter', i.e. a transparent filter that reduces light or specific wavelengths of light passing through it, such as an absorption filter. Another example is a dichroic filter, which operates on the principle of interference to selectively pass light of a small range of colours while reflecting other colours, thus effectively acting as a band-pass filter on the incident light. Such a spectral filter may be referred to in the following as an angular-dependent filter, since light is passed by the filter according to its wavelength and according to its angle of incidence. In a dichroic filter, alternating layers of optical coatings are applied to a substrate, usually glass, to selective 'reinforce' specific wavelengths of light and 'interfere' with other wavelengths. By appropriate choice of the thickness and number of layers, the band of light frequencies that are passed by the filter can be made wide or narrow, as desired. As the skilled person will know, such filters have a unique spectral response at each angle of incidence, i.e. for each angle of incidence of the incoming light, the transmission is a well-defined narrow Lorentzian varying from long wavelength transmission in case of surface normal angles to shorter wavelength transmission for increasing angles of incidence. In other words, light towards the 'red' end of the spectrum is strongly passed when striking the filter from directly above, while light from the 'blue' end of the spectrum is strongly passed when arriving at an oblique angle to the spectral filter. This is sometimes referred to as the 'blue-shift' of the filter response. One embodiment of the light sensor according to the invention comprises a filter arrangement in which the spectral filters comprise angular-dependent filters. The skilled person will know that the transmission peaks will depend on the colour of the light incident at the filters, the angle of incidence of the light, and of course on the spectral properties of the filters. Therefore, the analysis of the signals delivered by the regions of the sensor array preferably takes these facts into account.

By combining different spectral filters in a filter arrangement, essentially the entire wavelength spectrum of the incoming light can be analysed. For example, a filter arrangement with an array of 10-100 or more spectral filters could be used, in which the spectral filters are chosen to have incremental steps in spectral peak position in the wavelength range from 400 nm to 800 nm. One spectral filter might pass only light in the range 400 nm-440 nm, another might pass only light from about 440 nm-470 nm, and so on, thus essentially covering the wavelengths of the visible light spectrum. The filter arrangement may comprise only angular-independent filters, only angular-dependent filters, or a combination of both types. Long-pass filters or short-pass filters may also be used. Filters may also be stacked, for example a long-pass filter combined with a short-pass filter to give a band-pass filter. A set of short-pass filters, or long-pass filters, having different cut-off wavelengths, may also be used in connection with a differential detection of the light passing a pair of filters having adjacent cut-off wavelengths. This can be achieved, e.g., by measuring the respective intensity of light passing the two adjacent filters and subtracting the measured signals. Evidently, using more spectral filters with narrower band-pass regions will give a more accurate 'picture' of the spectral and angular distribution of the incoming light. When angular-dependent filters are used, the angular information obtained at the corresponding regions of the sensor array can be used to derive spectral properties of the incoming light. In the case of angular-independent filters, spectral and angular information obtained at the corresponding regions of the sensor array can be considered independently of each other. The angular dependence of the filters may be reduced by using absorption filters with steep edges.

The actual sensor array or 'image sensor' can comprise any suitable photosensors as sensor elements. For example, a charge-coupled device could be used. Owing to developments in semiconductor photosensors in recent years, accurate and economical CMOS devices are available based on active-pixel sensor (APS) technology, in which each 'pixel' or sensor element of the image comprises a photodetector and an active amplifier. Preferably, therefore, the sensor arrangement in light sensor according to the invention comprises a sensor array of active pixel sensors. Such an APS sensor array is manufactured using a CMOS (complementary metal-oxide semiconductor) process, and is also often referred to simply as a CMOS sensor. Each active pixel in the array generates a signal value directly related to the intensity of the incoming light at that pixel. In combination with a spectral filter, then, pixels of an APS image sensor can deliver output signals which provide information about the intensity of that particular spectral component and about the angle of incidence of the incoming light.

Regions of a sensor array can be allocated to corresponding spectral filters, depending on the image sensor dimensions. For example, a 1.3 Megapixel CMOS sensor (1280×1024 pixels) can be virtually divided into regions comprising 51×51 pixels (2601 pixels) for each spectral filter. Of course, other sensor array geometries may be used, for example a 'narrow' 1280×51 array with 24 channels or regions, each 51×51 pixels in size. Depending on the spatial arrangement of the spectral filters, whether square or rectangular, some regions such as the outer edges of the image sensor, or 'strips' between the regions may remain effectively unused or redundant. The image sensor can also be chosen on the basis of the application. For example, an image sensor comprising silicon is sensitive to light wavelengths between 190 nm and 1100 nm. Germanium sensor elements respond to wavelengths from 400 nm to 1700 nm. Indium-gallium-arsenide sensors are sensitive to wavelengths between 800 nm and 2600 nm, while lead sulphide sensor elements respond to wavelengths from about 1000 nm up to 3500 nm. Since a spectral filter is characterised by its shifting incoming light to longer wavelengths, a material that responds well in the infrared region (longer wavelengths) can better detect levels of 'redness' in the incoming light.

In the light sensor according to the invention, each pixel in a region associated with a spectral filter is therefore associated with a specific light wavelength and/or a specific angle of incidence. Considering that the light passes through an aperture and is possibly also focussed by a microlens, it is evident that light arriving at a particular pixel of the region is associated with a particular wavelength and a particular angle of incidence. The light of a room arriving at the spectral filters of the filter arrangement will therefore result in different 'images' on each region of the sensor array. The analysis unit of the light sensor according to the invention therefore preferably also comprises a memory for storing a set of reference values, wherein each reference value is associated with a sensor element or pixel of the sensor arrangement. If angular-dependent filters are used in the filter arrangement, the reference values for each sensor element of a region of the sensor array are preferably calculated to take into account the angular dependent spectral properties of the corresponding filter and the relative position of each pixel or sensor element to the centre of the filter. The pixel values or light composition values generated by the sensor elements of the regions can then be compared to the corresponding reference values. To this end, the light sensor device preferably also comprises a comparator for comparing a light composition value generated by an active pixel sensor to the corresponding reference value. If the image sensor is monochrome, the reference value may comprise a simple minimum intensity threshold value. Values beneath this threshold value, corresponding to 'weak' light intensity at the corresponding wavelength and angle of incidence, may for example be disregarded. In the case of an RGB image sensor, different reference values for the red, blue and green components of light may be stored for each pixel. The choice of image sensor—whether monochrome or RGB—can be made on the basis of the type of spectral filters being used and on the level of hardware/software complexity desired. To use the comparator results, then, the light sensor device preferably comprises a control signal generator for generating control signals for a light source on the basis of the light composition values pertaining to the composition of the incident light to adjust the colour and/or intensity of the light source. For example, certain regions of the sensor array may indicate that the light from a particular part of the room is too cool and of insufficient intensity. In that case, appropriate control signals can be generated for the corresponding luminaires to generate a warmer, brighter light in that area of the room.

A lighting arrangement according to the invention comprises a number of light sources for generating light, a light sensor device for determining the direction of origin and/or the spectral composition of the incoming light originating from the light sources (and perhaps also daylight) incident at the light sensor device and generating control signals for at least one of the light sources accordingly. The lighting arrangement also comprises a control interface for applying a control signal to the corresponding light source. The control interface can be wired or wireless—for example a Bluetooth® or a Zigbee interface—and the control signals can be generated and transmitted using the appropriate protocol. Each light source of the lighting arrangement preferably comprises a suitable receiver for receiving and applying the control signals.

This may best be explained with an example, for instance a room with a window zone, a corridor zone, and a lighting arrangement with a number of light sources distributed about the room. The light sensor, with its array of spectral filters and positioned somewhere in the room, obtains a set of 'images' of the light distribution. Because angular and spectral distribution of the light can easily be determined by analyzing these images, as will be explained in more detail with reference to the figures, any unsatisfactory light quality can be compensated for by generating appropriate control signals. For example, if images corresponding to the window area are observed to be relatively bright (yellowish daylight), while images corresponding to the corridor area are observed to be too cool (blueish artificial light), control signals can be generated by the light sensor device for the light sources in the room to alter the light intensity or colour point in order to compensate for any 'unevenness'. Alternatively, a certain 'light atmosphere' can be created and maintained, for example the illumination of a specific area in a specific colour. This type of closed-loop feedback analysis can be carried out at intervals, so that a smooth adaptation of the light quality is performed throughout the day. Optimized light control leads to an advantageous reduction in energy consumption.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
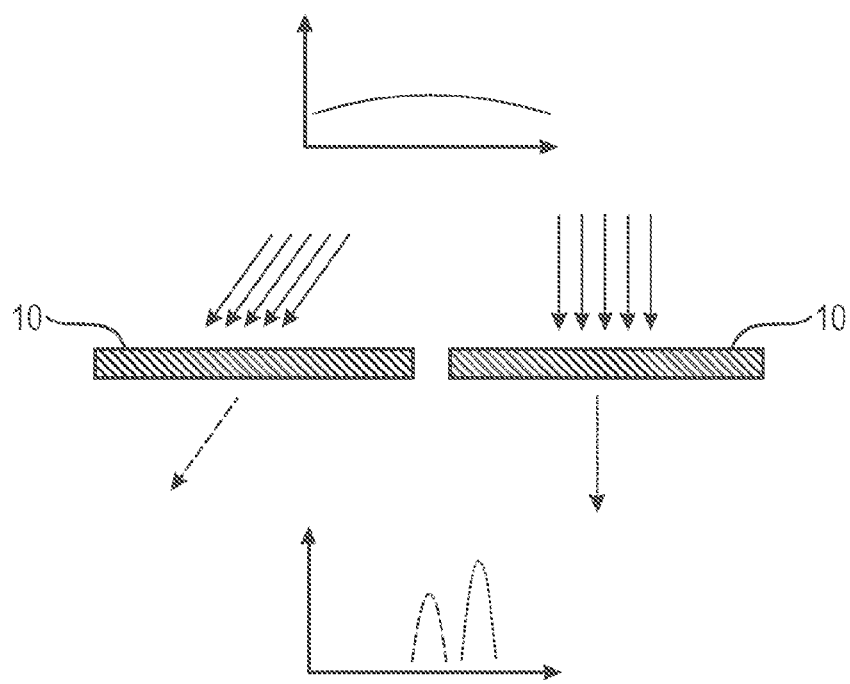
FIG. 1 shows graphs of spectral distribution of light before and after filtering through a dichroic spectral filter.

FIG. 1 shows graphs of spectral distribution of light before and after filtering through a dichroic or angular-dependent spectral filter 10. The graph in the upper part of the diagram shows an essentially even spectral distribution of the light, i.e. the light comprises several different wavelength components. When the light arrives at an oblique angle to the spectral filter, only light towards the blue end of the spectrum is passed, and other wavelengths are reflected. This is illustrated by the left-hand filter 10 in the diagram. Light arriving from above, i.e. surface normal to the filter, is filtered such that light with predominantly red wavelength is passed, whereas other wavelengths are reflected. The resulting transmission peaks are shown in the lower part of the diagram, and illustrate a Lorentzian with lower maximum for 'blue' wavelengths (dashed) and a high maximum for 'red' wavelengths (dotted line).

Figure 2:
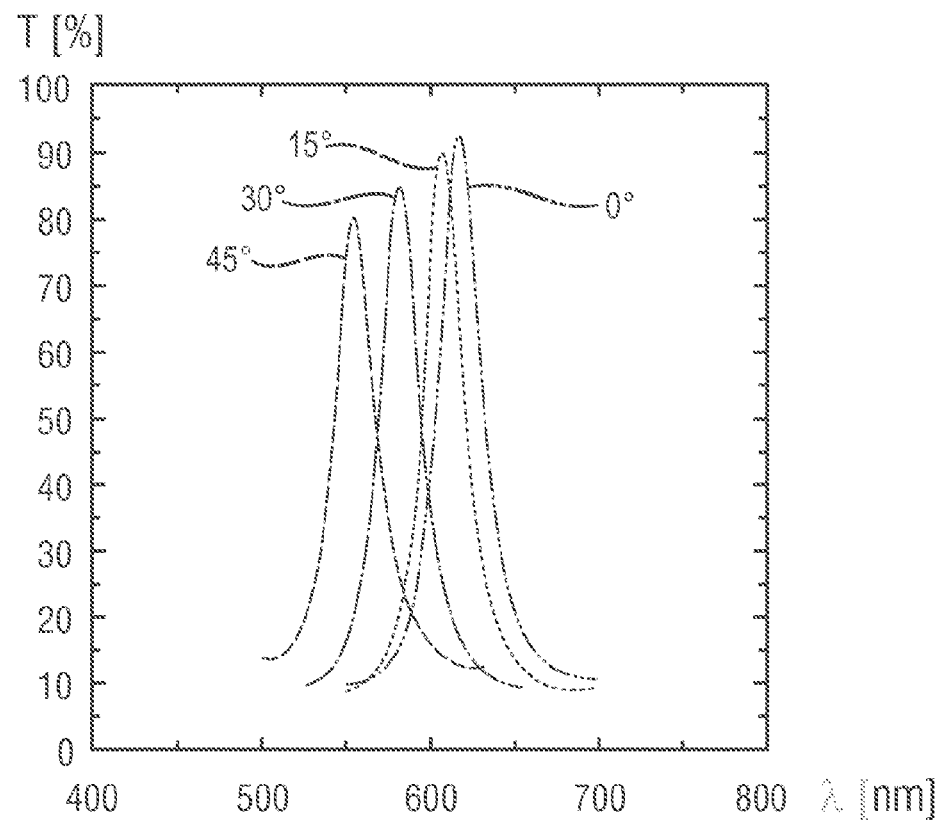
FIG. 2 shows a more detailed rendering of transmission peaks for light filtered by a dichroic spectral filter.

FIG. 2 shows a more detailed rendering of transmission peaks for light filtered by a dichroic spectral filter. The Y-axis represents transmission T in percent, and the X-axis represents wavelength $\lambda$ in nanometers. Here, the strongest peak is obtained for longer wavelengths of light arriving surface normal, i.e. at 0° to the filter. Successively lower peaks are observed for increasing angles of incidence: 15° (reddish) 30° (green) and 45° (blue), demonstrating the shift properties of the dichroic spectral filter.

Figure 3:
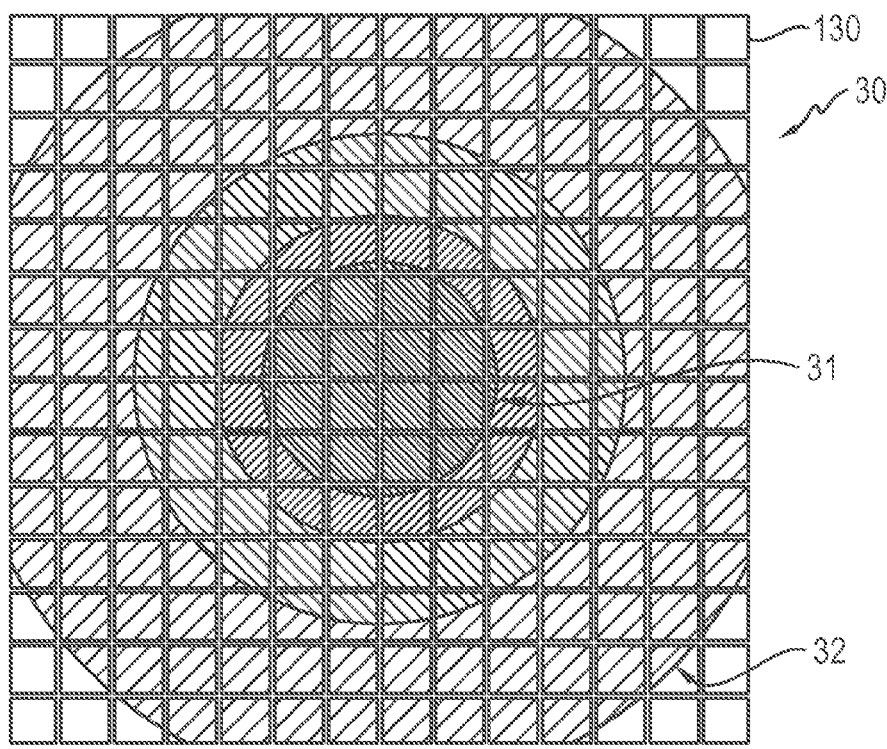
FIG. 3 shows a simplified rendering of a region of a sensor arrangement of a light sensor according to the invention, and shows annular regions associated with different light wavelengths.

FIG. 3 shows a simplified rendering of a region 30 of a sensor arrangement of a light sensor according to the invention with annular regions 31, 32 associated with different light wavelengths. Here, a dichroic filter is used as a spectral filter, as explained above with the aid of FIGS. 1 and 2. Each square represents a sensor element 130 or pixel 130, which can be realized as an active-pixel sensor (APS). The radial pattern on the pixels of the region 30 (under a single aperture or aperture/lens combination) relates different spectral lines as described in FIG. 2. An inner ring 31 corresponds to light of longer wavelengths, while an outer ring 32 corresponds to light of shorter wavelengths. Pixels within the rings 31, 32 can register incoming light intensities at the corresponding wavelengths, and each pixel of the region 30 can be associated with a particular wavelength. Pixels in the outer corners may remain effectively unused.

Figure 4:
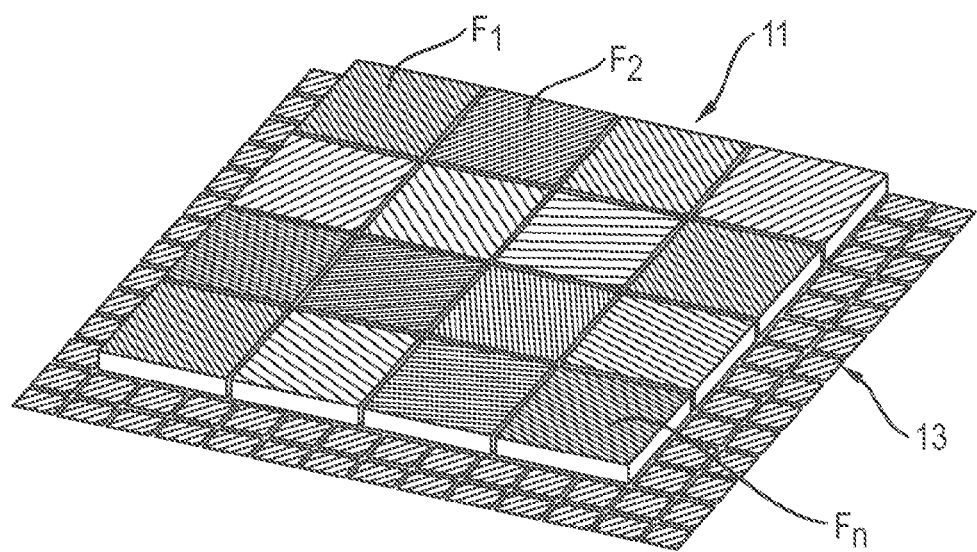
FIG. 4 shows a filter arrangement and a sensor arrangement of a light sensor according to an embodiment of the invention.

FIG. 4 shows a filter arrangement 11 and a sensor arrangement 13 of a light sensor 1 according to an embodiment of the invention. For the sake of clarity, the aperture arrangement and a microlens array are not shown, but these may be visualized as being located between the sensor arrangement 13 and the filter arrangement 11. This very simplified diagram only indicates the pixel arrangement. In reality, a much larger pixel array, for example a 1.3 Megapixel CMOS sensor, would be used. This would allow approximately 50 spectral filters $F_1, F_2, \ldots, F_n$ for imaging the light onto 51×51 pixel array regions of the sensor. The dimension of the image sensor, in the case of a 1.3 Megapixel CMOS sensor, can comprise about 6.6×5.32 mm. The size of each dichroic filter $F_1, F_2, \ldots, F_n$ shown in the diagram is about 1 mm square. Each filter $F_1, F_2, \ldots, F_n$ in turn is associated with a region or pixel array, for example arrays of 51×51 pixels. For a 1.3 Megapixel CMOS sensor, this gives an area of about 0.255 mm×0.255 mm for each region of the sensor array.

Figure 5:
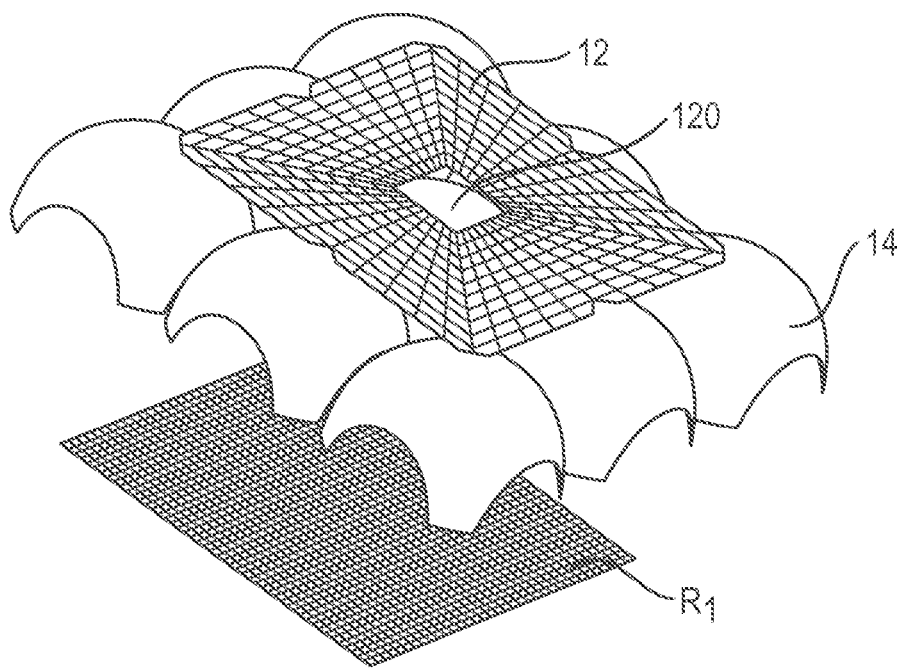
FIG. 5 shows an aperture, a microlens array and a region of a sensor arrangement in one embodiment of a light sensor according to the invention.

FIG. 5 shows an aperture 120 of an aperture arrangement 12, a microlens array 14 and a region $R_1$ of sensor arrangement 13 in one embodiment of a light sensor according to the invention. This diagram shows a preferred arrangement of the microlenses of the microlens array 14 between the aperture arrangement 12 and the image sensor 13. Here, the aperture 120 is shown to be a rectangular opening, but can of course have any other appropriate shape, for instance a round opening, or a slit along the length of the aperture arrangement 12. For the sake of clarity, the spectral filter of the filter arrangement, associated with this region $R_1$, is not shown in the diagram. Effectively, only one microlens is used for the one region $R_1$ of the sensor array, but it is easier to manufacture the microlenses 'in one piece'. Only that part of the aperture arrangement 12 associated with the one region $R_1$ is shown in the diagram, but this essentially repeats so that each region of the image sensor has its own aperture and its own spectral filter.

Figure 6:
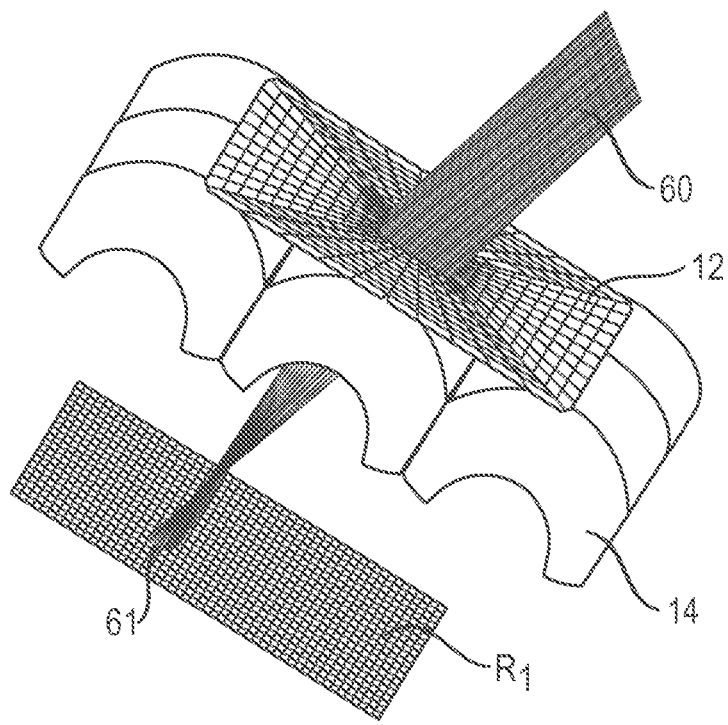
FIG. 6 shows the path of a beam of light arriving at the arrangement of FIG. 5.

FIG. 6 shows another view of the arrangement of FIG. 4 as well as the path of a beam 60 of light L arriving at the aperture after being filtered by the associated spectral filter (which is not shown in the diagram). As the diagram clearly illustrates, the beam 60 of light is focussed by the aperture/lens combination so that the pixels in a corresponding section 61 of the region $R_1$ are stimulated. Only these pixels will generate appropriate signals in response to the incoming beam 60 of light, and therefore comprise light composition information such as light intensity and wavelength for that beam 60 of light. The diagram also shows that, of the microlenses positioned over a region of the sensor corresponding to a filter, only one lens is used for focussing the light, while the other lenses over this region are redundant. The same applies of course to all other regions/filters of the light sensor, and only one such combination is shown here for the purposes of illustration.

Figure 7A:
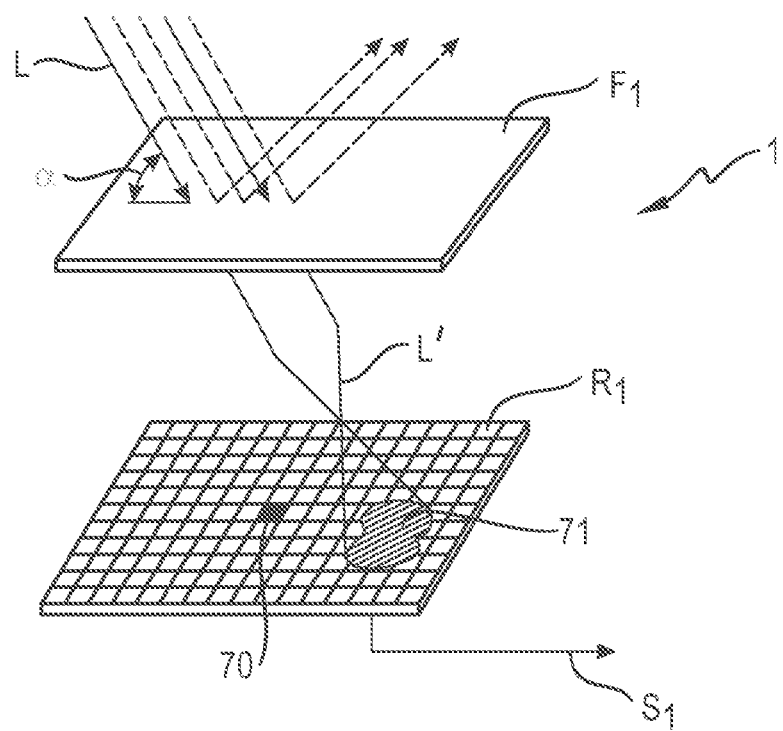
FIG. 7a shows a simplified rendering of a spectral filter and a sensor arrangement in a light sensor according to an embodiment of the invention, with a beam of light arriving at an oblique angle to the spectral filter.
Figure 7B:
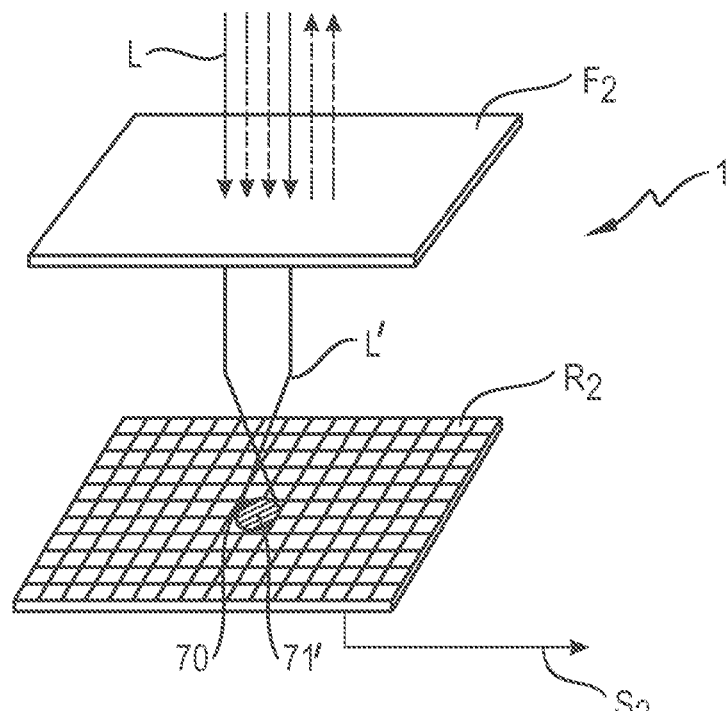
FIG. 7b shows a simplified rendering of a spectral filter and a sensor arrangement in a light sensor according to an embodiment of the invention, with a beam of light arriving from directly above the spectral filter.

To better illustrate the functioning of the light sensor 1 according to the invention, FIGS. 7a and 7b show a simplified rendering of a spectral filter $F_1$ and a corresponding region $R_1$ of a sensor arrangement. Here, the spectral filters $F_1, F_2$ can be simple light filters without angular dependency. For the sake of clarity, neither aperture nor microlens are shown in the diagram, but are assumed to be present as indicated by the focussing of the admitted filtered beam of light L'. In FIG. 7a, the beam of light L arrives at an oblique angle $\alpha$ to the spectral filter $F_1$. Depending on the properties of the spectral filter $F_1$, only light of a certain wavelength is passed by the filter $F_1$ to arrive at the pixels in the area 71 of this region $R_1$ of the sensor array, and other wavelengths are simply reflected. Knowing the properties of the filter $F_1$, a resulting signal $S_1$ can be analysed to deduce spectral information about the incoming light. Knowing the location of the area 71 with respect to the centre 70 of the region $R_1$, the signal $S_1$ yields angular information about the incoming light. For instance, this spectral filter $F_1$ contributes the information that light of this wavelength is present to a certain intensity in the light arriving at the light sensor at an angle $\alpha$. Each spectral filter in the filter arrangement contributes such information. For example, FIG. 7b shows a further spectral filter $F_2$, which only passes light of a second wavelength. Here, light of that wavelength arriving from an essentially surface normal direction (angle of incidence effectively=0°) is passed to arrive at the region 71.

Again, a resulting signal $S_2$ yields spectral and angular information about the light L arriving at that filter $F_2$. If dichroic spectral filters were to be used, the resulting signals would be interpreted according to the angular dependency of the filters. The angle of incidence is directly related to the origin of the light L with respect to the light sensor 1, and can be derived from the position of the 'image' on the sensor array. Signals $S_1, S_2$ generated by the sensor elements are analyzed accordingly in the analysis unit 2. If angular-dependent filters were to be used instead, angular information delivered by the sensor elements could be used to derive spectral information about the incoming light L. The combined information from all of the spectral filters in the filter arrangement of the light sensor gives an overall 'picture' of the angular and spectral distribution of the light in the room.

Figure 8:
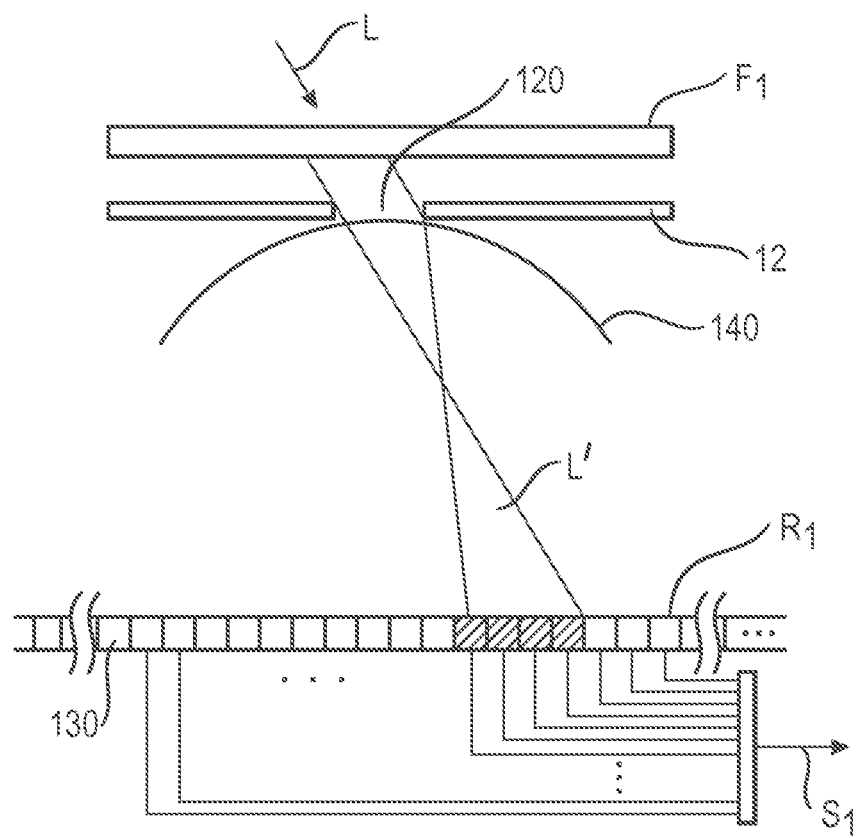
FIG. 8 shows a side view through an embodiment of the light sensor according to the invention.

FIG. 8 shows a very simplified side view through an embodiment of the light sensor 1 according to the invention and illustrates an arrangement in which a spectral filter $F_1$ is placed above an aperture arrangement 12 with an aperture 120 which in turn is located above a microlens 140. A fraction of the light L arriving at the spectral filter $F_1$ is admitted by the aperture 120 and focussed by the microlens 140. Light arriving at an oblique angle as shown is collected by the aperture 120 and focused by the lens 140. The admitted filtered light L' strikes some of the pixels (indicated by hatching) in a corresponding region $R_1$ of a CMOS sensor 13 at a distance removed from the centre of the region $R_1$. The sensor 13 comprises an array of active pixel sensors 130, each of which can generate a signal in response to incoming light. The signals of each active pixel sensor 130 are combined to give a signal $S_1$ for that region $R_1$ and forwarded to an analysis unit, as will be explained with the aid of FIG. 9.

Figure 9:
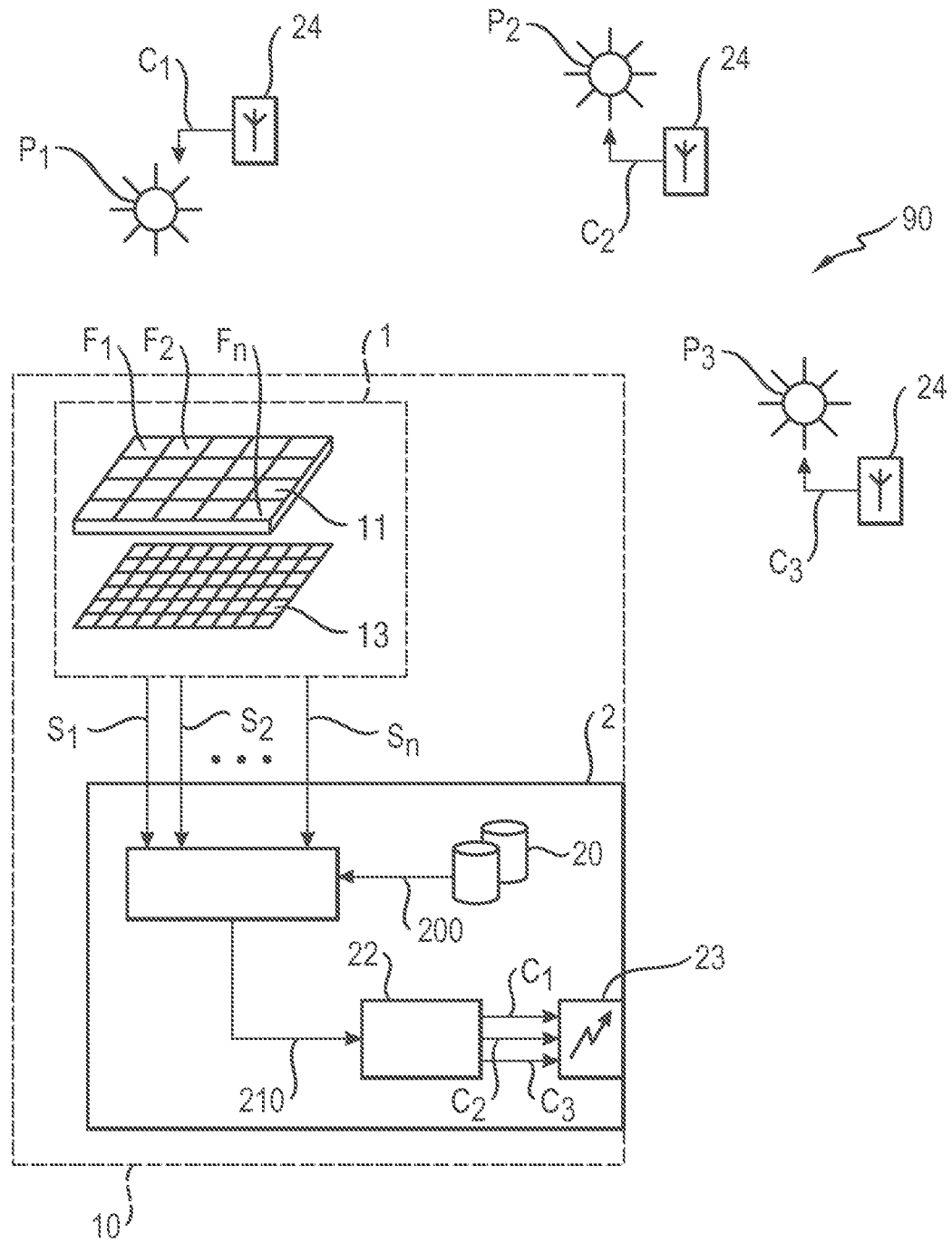
FIG. 9 shows a block diagram of a light sensor device according to an embodiment of the invention for controlling a number of light sources.

FIG. 9 shows a block diagram of a lighting arrangement with a light sensor device 10 according to an embodiment of the invention for controlling a number of light sources $P_1, P_2, P_3$. Here, the light sensor device 10 comprises a light sensor 1 and an analysis unit 2. The analysis 2 unit can be any suitable digital processing unit (DPU) 2. The signals $S_1, S_2, \ldots, S_n$ generated by the sensor elements of the regions of the sensor array associated with the spectral filters $F_1, F_2, \ldots, F_n$ of the filter arrangement 11 are passed to a comparator 21 of the analysis unit 2, where individual pixel values are compared to reference values 200 retrieved from a memory 20 to derive light composition values 210 for the incoming light. The comparator 210 may also be configured to provide a differential detection if the spectral filters $F_1, F_2, \ldots, F_n$ are short-pass or long-pass filters. This can be achieved by subtracting a pair of signals $S_1, S_2, \ldots, S_n$ generated by sensor elements associated with a pair of spectral filters $F_1, F_2, \ldots, F_n$ having adjacent cut-off wavelengths. Analysis of the signals $S_1, S_2, \ldots, S_n$ may show that the incoming light from the light sources $P_1, P_2, P_3$ has a certain spectral and angular distribution, for example a too bright region corresponding to light source $P_1$, a too reddish region corresponding to light source $P_2$, and a too greenish region corresponding to light source $P_3$. Then, control signals $C_1, C_2, C_3$ can be generated in a control signal generator 22 to appropriately control the light sources $P_1, P_2, P_3$. In this example, control signal $C_1$ can serve to dim the light source $P_1$, control signal $C_2$ can serve to decrease the red component of the light generated by light source $P_2$, and control signal $C_3$ can serve to decrease the green component of the light generated by light source $P_3$. The signals are forwarded to the light sources by means of a communication interface 23, 24 comprising a transmitter 23 in the light sensor device 10 and a receiver 24 for each of the light sources $P_1, P_2, P_3$.

The analysis of the signals can be carried out continuously or at predetermined intervals, e.g. every 10 minutes or every half-hour, as appropriate. The interval can also be dynamically adapted according, for example, to the brightness of any natural light coming in through a window. The lighting arrangement can, for example, be installed in a shop window in which products are artificially illuminated in order to create a certain constant colour effect, a 'light atmosphere' or a shadow effect, even when daylight or sunlight changes the external illumination. Predefined lighting parameters, for example to illuminate objects or products in a shop window as naturally as possible, may be taken into consideration in the analysis of the signals $S_1, S_2, \ldots, S_n$. When the lighting arrangement is installed in an office environment, where daylight should preferably be mimicked regardless the external weather conditions or time of day, certain desired spectral characteristics of the light can be defined, and the intensities and colour temperatures of the light sources can be continually adjusted throughout the course of the day.

For the sake of clarity, it is to be understood that the use of "a" or "an" throughout this application does not exclude a plurality, and "comprising" does not exclude other steps or elements. A "unit" or "module" can comprise a number of units or modules, unless otherwise stated.

The invention claimed is:

1. A light sensor comprising
a filter arrangement, which filter arrangement comprises a number of spectral filters for filtering incident light, wherein a spectral filter is realized to pass a distinct component of the incident light;
an aperture arrangement including a plurality of apertures for admitting a fraction of the incident light;
a sensor arrangement realized to collect the admitted filtered light, which sensor arrangement comprises an array of sensor elements for generating image-related signals and which sensor array is sub-divided into a plurality of regions, wherein each region of the sensor array includes a plurality of sensor elements and is allocated to an aperture of said plurality of apertures and a corresponding spectral filter such that an image-related signal generated by a sensor element of a particular region comprises information pertaining to the direction of origin and/or the spectral composition of the light passed by the corresponding spectral filter.

2. A light sensor comprising
a filter arrangement, which filter arrangement comprises a number of spectral filters for filtering incident light, wherein a spectral filter is realized to pass a distinct component of the incident light;
an aperture arrangement for admitting a fraction of the incident light;
a sensor arrangement realized to collect the admitted filtered light, which sensor arrangement comprises an array of sensor elements for generating image-related signals and which sensor array is sub-divided into a number of regions, wherein a region of the sensor array is allocated to a corresponding spectral filter such that an image-related signal generated by a sensor element of a particular region comprises information pertaining to the direction of origin and/or the spectral composition of the light passed by the corresponding spectral filter,
such that an aperture of the aperture arrangement is located between a spectral filter of the filter arrangement and a corresponding region of the sensor arrangement.

3. A light sensor comprising
a filter arrangement, which filter arrangement comprises a number of spectral filters for filtering incident light, wherein a spectral filter is realized to pass a distinct component of the incident light;
an aperture arrangement for admitting a fraction of the incident light;
a sensor arrangement realized to collect the admitted filtered light, which sensor arrangement comprises an array of sensor elements for generating image-related signals and which sensor array is sub-divided into a number of regions, wherein a region of the sensor array is allocated to a corresponding spectral filter such that an image-related signal generated by a sensor element of a particular region comprises information pertaining to the direction of origin and/or the spectral composition of the light passed by the corresponding spectral filter,
a lens arrangement for focussing the admitted filtered light onto a region of the sensor arrangement.

4. A light sensor comprising
a filter arrangement, which filter arrangement comprises a number of spectral filters for filtering incident light, wherein a spectral filter is realized to pass a distinct component of the incident light;
an aperture arrangement for admitting a fraction of the incident light;
a sensor arrangement realized to collect the admitted filtered light, which sensor arrangement comprises an array of sensor elements for generating image-related signals and which sensor array is sub-divided into a number of regions, wherein a region of the sensor array is allocated to a corresponding spectral filter such that an image-related signal generated by a sensor element of a particular region comprises information pertaining to the direction of origin and/or the spectral composition of the light passed by the corresponding spectral filter,
wherein the filter arrangement comprises an array of at least 30 filters and the array of sensor elements is sub-divided into a corresponding number of regions such that each region corresponds to a specific filter, and wherein each filter is allocated to a specific aperture of the aperture arrangement and a specific lens of a lens arrangement.

5. A light sensor according to claim 1, wherein a filter of the filter arrangement comprises an angular dependent filter.

6. A light sensor according to claim 1, wherein a filter of the filter arrangement comprises an angular independent filter.

7. A light sensor according to claim 1, wherein the sensor arrangement comprises an array of active pixel sensors.

8. A light sensor device for determining the direction of origin and/or the spectral composition of light incident at the light sensor device, comprising
a light sensor according to claim 1 for generating image-related signals in response to admitted filtered light collected by the light sensor;
an analysis unit for analysing the image-related signals to determine the direction of origin and/or the spectral composition of light incident at the light sensor device.

9. A light sensor device according to claim 8, wherein each sensor element of the sensor arrangement is associated with a specific light wavelength and/or a specific angle of incidence, and the analysis unit comprises
a memory for storing a set of reference values, wherein each reference value is associated with a sensor element of the sensor arrangement and
a comparator for comparing a signal generated by a sensor element of the sensor arrangement to a corresponding reference value to derive a light composition value for that wavelength and/or angle of incidence.

10. A light sensor device according to claim 8, comprising a control signal generator for generating control signals for a light source on the basis of a light composition values pertaining to the composition of the incident light to adjust the colour and/or intensity of the light source.

11. A lighting arrangement comprising
a number of light sources for generating light;
a light sensor device according to claim 8 for determining the direction of origin and/or the spectral composition of light incident at a light sensor of the light sensor device and generating control signals for at least one of the light sources accordingly; and
a communication interface for applying a control signal to the corresponding light source.

12. A method of collecting incident light, which method comprises the steps of
filtering the incident light through a filter arrangement, which filter arrangement comprises a number of spectral filters for filtering incident light, wherein a spectral filter is realized to pass a distinct component of the incident light;
admitting a fraction of the incident light through an aperture arrangement including a plurality of apertures;
collecting the admitted filtered light at a sensor arrangement comprising an array of sensor elements for generating image-related signals, which sensor array is sub-divided into a plurality of regions and wherein each region of the sensor array includes a plurality of sensor elements and is allocated to an aperture of said plurality of apertures and a corresponding spectral filter of said plurality of filters such that an image-related signal generated by a sensor element of a particular region comprises information pertaining to the direction of origin and/or the spectral composition of the light passed by the corresponding spectral filter.

13. A method of determining the direction of origin and/or the spectral composition of incident light, which method comprises the steps of
collecting the light in a light sensor to generate image-related signals in response to admitted filtered light collected by the light sensor using the method according to claim 12, and
analysing the image-related signals to determine the direction of origin and/or the spectral composition of light incident at the light sensor device.

14. A light sensor comprising
a filter arrangement, which filter arrangement comprises a number of spectral filters for filtering incident light, wherein a spectral filter is realized to pass a distinct component of the incident light;
an aperture arrangement for admitting a fraction of the incident light;
a sensor arrangement realized to collect the admitted filtered light, which sensor arrangement comprises an array of sensor elements for generating image-related signals and which sensor array is sub-divided into a number of regions, wherein a region of the sensor array is allocated to a corresponding spectral filter such that an image-related signal generated by a sensor element of a particular region comprises information pertaining to the direction of origin and/or the spectral composition of the light passed by the corresponding spectral filter;
the light sensor arranged for generating image-related signals in response to admitted filtered light collected by the light sensor;
an analysis unit for analyzing the image-related signals to determine the direction of origin and/or the spectral composition of light incident at the light sensor device;
wherein each sensor of the sensor arrangement is associated with a specific light wavelength and/or a specific angle of incidence, and the analysis unit includes a memory for storing a set of reference values, wherein each reference value is associated with a sensor element of the sensor arrangement, and
a comparator for comparing a signal generated by a sensor element of the sensor arrangement to a corresponding reference value to derive a light composition value for that wavelength and/or angle of incidence.

15. A light sensor comprising
a filter arrangement, which filter arrangement comprises a number of spectral filters for filtering incident light, wherein a spectral filter is realized to pass a distinct component of the incident light;
an aperture arrangement for admitting a fraction of the incident light;
a sensor arrangement realized to collect the admitted filtered light, which sensor arrangement comprises an array of sensor elements for generating image-related signals and which sensor array is sub-divided into a number of regions, wherein a region of the sensor array is allocated to a corresponding spectral filter such that an image-related signal generated by a sensor element of a particular region comprises information pertaining to the direction of origin and/or the spectral composition of the light passed by the corresponding spectral filter;
the light sensor arranged for generating image-related signals in response to admitted filtered light collected by the light sensor;
an analysis unit for analyzing the image-related signals to determine the direction of origin and/or the spectral composition of light incident at the light sensor device;
a control signal generator for generating control signals for a light source on the basis of a light composition values pertaining to the composition of the incident light to adjust the color and/or intensity of the light source.

* * * * *